United States Patent
Li et al.

(10) Patent No.: US 10,607,325 B2
(45) Date of Patent: Mar. 31, 2020

(54) METHODS FOR ENHANCING IMAGE CONTRAST AND RELATED IMAGE PROCESSING SYSTEMS THEREOF

(71) Applicant: Shanghai Zhaoxin Semiconductor Co., Ltd., Shanghai (CN)

(72) Inventors: Fuwen Li, Beijing (CN); Yichen Li, Beijing (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 173 days.

(21) Appl. No.: 15/810,728

(22) Filed: Nov. 13, 2017

(65) Prior Publication Data

US 2019/0043176 A1    Feb. 7, 2019

(30) Foreign Application Priority Data

Aug. 4, 2017  (CN) .......................... 2017 1 0659808

(51) Int. Cl.
*G06K 9/00* (2006.01)
*G06T 5/00* (2006.01)
*G06T 5/40* (2006.01)

(52) U.S. Cl.
CPC .............. *G06T 5/009* (2013.01); *G06T 5/40* (2013.01); *G06T 2207/20008* (2013.01); *G06T 2207/20072* (2013.01)

(58) Field of Classification Search
CPC . G06T 2207/20008; G06T 2207/20072; G06T 5/009; G06T 5/40
See application file for complete search history.

(56) References Cited

U.S. PATENT DOCUMENTS

| | | | | |
|---|---|---|---|---|
| 8,009,907 B1* | 8/2011 | Srinivasan | .............. | G06T 5/009 382/168 |
| 8,295,596 B1* | 10/2012 | Srinivasan | ................ | G06T 5/40 348/234 |
| 9,076,224 B1* | 7/2015 | Shah | ....................... | G06T 5/009 |

(Continued)

FOREIGN PATENT DOCUMENTS

CN    102542536    *    7/2012    ............... G06T 5/40

*Primary Examiner* — Amara Abdi
(74) *Attorney, Agent, or Firm* — McClure, Qualey & Rodack, LLP (57) ABSTRACT

Methods for enhancing image contrast applied to an image processing system are provided. The method includes the steps of: obtaining a first image; generating a first histogram information based on the first image; obtaining, a first parameter and a second parameter of the first image based on the first histogram information, wherein the first parameter is related to the number of homogeneous regions of the first image and the second parameter is related to an average luminance information of the first image; performing a weighted calculation based on the first parameter and the second parameter to determine a restriction parameter; performing a contrast limited histogram equalization processing on the first histogram information using the restriction parameter to generate a second histogram information; and adjusting the first image based on the second histogram information and a mapping curve to generate a second image with contrast enhancement effect.

19 Claims, 5 Drawing Sheets

(56) References Cited

U.S. PATENT DOCUMENTS

| | | | |
|---|---|---|---|
| 2005/0031201 A1* | 2/2005 | Goh | G06T 5/009 |
| | | | 382/169 |
| 2017/0041543 A1* | 2/2017 | Kikuchi | H04N 5/23274 |
| 2017/0366729 A1* | 12/2017 | Itoh | G06T 5/009 |
| 2019/0080441 A1* | 3/2019 | Guo | G06T 5/40 |

* cited by examiner

METHODS FOR ENHANCING IMAGE CONTRAST AND RELATED IMAGE PROCESSING SYSTEMS THEREOF

CROSS REFERENCE TO RELATED APPLICATIONS

This Application claims priority of China Application No. 201710659808.4, filed on Aug. 4, 2017, and the entirety of which is incorporated by reference herein.

BACKGROUND OF THE INVENTION

Field of the Invention

The invention generally relates to image processing, and more particularly, to an image processing system for enhancing image contrast based on histogram equalization processing and method for enhancing image contrast thereof.

Description of the Related Art

Image contrast enhancement is a very important basic processing technique for enhancing image contrast. Using one of different image enhancement processing techniques, the contrast of images originally with inadequate contrast expression or burred images can be enhanced to become clear images. Histogram Equalization (HE) algorithm for image enhancement is a common technique used to enhance image contrast. By spreading the gray scale distribution of histogram, the pixel values of the images can be remapped, thereby achieving effect of contrast enhancement. Since HE algorithm for enhancing image contrast is a simple and effective, it has been widely used in medical imaging, text recognition, multimedia imaging, and other computer visual related fields. However, HE algorithm, type of global enhanced image contrast method, is likely to result in loss of details during image detail expression or cause excessive image contrast enhancement that may affect the authenticity of the overall image luminance.

Adaptive histogram equalization (AHE) algorithm is another type of image enhancement technique used to enhance image contrast. In particular, AHE algorithm redistributes luminance to change image contrast by calculating the local histogram of an image, such as perform equalization to one pixel through the histogram of surrounding pixels (within a rectangular range in the peripheral) thereof. Although AHE is suitable for changing the local contrast of an image and obtaining more image details, its main drawback is the noise in the homogeneous region (i.e. the same area in the image) becomes amplified, which in turn reduces image quality. Contrast limited histogram equalization (CLHE) algorithm is a method for overcoming the main drawback of AHE algorithm, which can limit such unfavorable noise amplification to a certain extent. CLHE algorithm may clip the global histogram of the entire image based on a predefined contrast limited parameter, and then evenly distribute the parts exceeding the contrast limited parameter throughout the entire histogram, reducing the noise amplification. However, since CLHE algorithm uses the same contrast limited parameter as threshold value for all the scenes, it cannot adapt to more different scenes, neither is it favorable for engineering applications.

BRIEF SUMMARY OF THE INVENTION

Methods for enhancing image contrast and associated image processing systems are provided.

In an exemplary embodiment, a method for enhancing image contrast applied to an image processing system is provided. The method includes the steps of: obtaining a first image; generating a first histogram information based on the first image; obtaining a first parameter and a second parameter of the first image based on the first histogram information; performing a weighted calculation based on the first parameter and the second parameter to determine a restriction parameter; performing a contrast limited histogram equalization processing on the first histogram information by using the restriction parameter to generate a second histogram information; and adjusting the first image based on the second histogram information and a mapping curve to generate a second image with contrast enhancement effect.

In another exemplary embodiment, a method for enhancing image contrast applied to an image processing system is provided, comprising the steps of: obtaining a first image; generating a first histogram information based on the first image; obtaining a cumulative-distribution-function (CDF) curve according to the first histogram information; generating an adaptive curve according to a high-contrast curve and a low-contrast curve; using the adaptive curve to adjust the CDF curve to generate a mapping curve; and adjusting the first image using the mapping curve to generate a second image with contrast enhancement effect. The method for enhancing image contrast may be applied to many fields of image processing, such as tone mapping.

Another exemplary embodiment of an image data processing system comprises an image input device, a storage device, and an image processor. The image processor is coupled to the image input device and the storage device for obtaining a first image from the image input device or the storage device, generating a first histogram information based on the first image, obtaining a first parameter and a second parameter of the first image based on the first histogram information, performing a weighted calculation based on the first parameter and the second parameter to determine a restriction parameter, performing a contrast limited histogram equalization processing on the first histogram information using the restriction parameter to generate a second histogram information, and adjusting the first image based on the second histogram information and a mapping curve to generate a second image with contrast enhancement effect.

Methods disclosed above may be implemented by the disclosed apparatuses or systems which are hardware or firmware capable of performing particular functions and may be in the form of program code embodied in a tangible media. When the program code is loaded into and executed by an electronic device, a processor, a computer or a machine, the electronic device, the processor, the computer or the machine becomes an apparatus for implementing the disclosed method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. It should be understood that the embodiments may be realized in software, hardware, firmware, or any combination thereof.

Embodiments of the invention provide an image processing system and a method thereof for enhancing image contrast, which can adopt different contrast restriction parameters according to the features of images in different scenes, such as the size and number of homogeneous regions, the image luminance information, so as to reduce the noise amplification in the homogeneous regions of an image and enhancing scene luminance and achieve contrast optimization of the image, thereby obtaining better images or video with contrast enhancement effect.

In the embodiments of the present invention, an adaptive contrast restriction parameter is proposed to perform contrast limited histogram equalization processing. The adaptive contrast restriction parameter may be determined by homogeneous region size/number related parameters and image average luminance related parameters, which are calculated based on image histogram. Additionally, different from the method of using one fixed curve as the mapping curve in the prior art, the present invention utilizes two reference curves to determine the mapping curve, thus generating adaptive mapping curves that meet the needs of various scenes.

Figure 1:
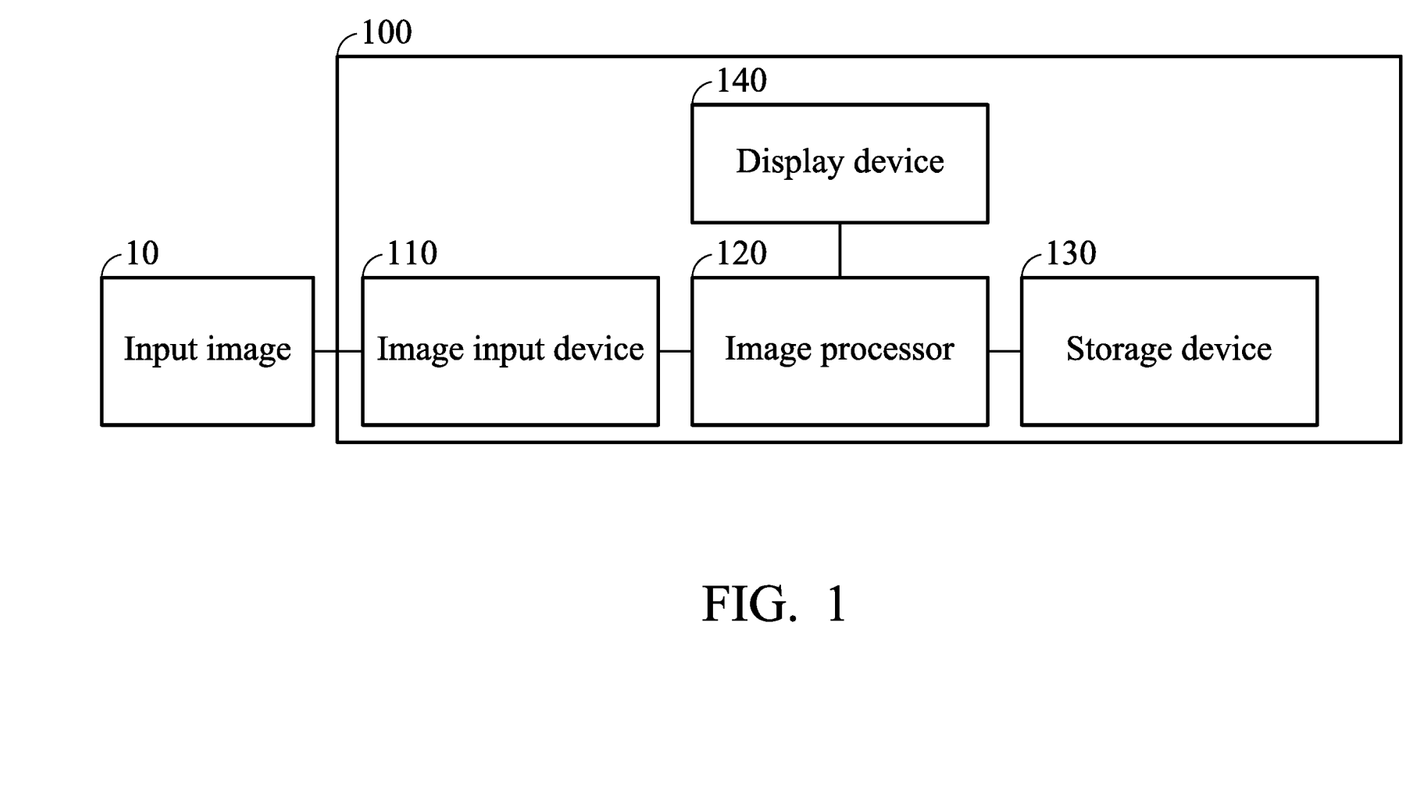
FIG. 1 is a schematic diagram of an image processing system according to an exemplary embodiment.

FIG. 1 is a schematic diagram of an image processing system according to an exemplary embodiment. As shown in FIG. 1, the image processing system 100 may include an image input device 110, an image processor 120, a storage device 130, and a display device 140. The image input device 110 may be configured to receive or acquire an input image 10 and provide the input image 10 to the image processor 120 for subsequent image analyzing and processing. For example, the image processing system 100 may be a laptop computer, a desktop computer, a tablet device, or other handheld device (e.g., a smartphone), but the invention is not limited thereto. For example, in an embodiment, the image input device 110 may be an image acquisition unit, such as one of an infrared image acquisition device, a Charge Coupled Device (CCD) element or Complementary Metal Oxide Semiconductor (CMOS) sensing element, or any combination thereof, and the invention is not limited thereto. The input image 10 may be a picture or a frame of a video (film), and the input image 10 includes a scene.

The image processor 120, which is coupled to the image input device 110 and the storage device 130, may be used to execute one or more types of computer-readable mediums stored within the storage devices 130 and execute instruction set and/or program codes to perform the method for enhancing image contrast of the present invention based on the input image provided by the image input device 110 or the storage device 130, which will be discussed further in the following paragraphs. The image processor 120 may be a Central Processing Unit (CPU), a Micro-Control Unit (MCU), a Graphics Processing Unit (GPU), a Digital Signal Processor (DSP), or the like, which can perform the function of image data analyzing, processing and computing. The storage device 130 may be a non-volatile storage medium (e.g., Read-Only Memory (ROM), Flash memory, magnetic tape, hard disk, or optical disc), a volatile storage medium (e.g., Random Access Memory (RAM)), or any combination thereof for storing data, such as intermediate data generated during the calculation process and the result data and so on. In some embodiments, the storage device 130 may store the input image(s) 10 in advance, and the image processor 120 may directly access the input image(s) 10 from the storage device 130 for subsequent processing, rather than from the image input device 110.

The display device 140 may be any device capable of displaying or showing image processing results. The display device 140 may display related data, such as texts, figures, interfaces, and/or image processing results. The display device 140, such as a liquid crystal display (LCD) etc., may be configured to show image processing results (including any image format, such as bmp, jpg, png and other formats etc.) or display the results of the recognition. It could be understood that, in some embodiments, the display device 140 may be a screen integrated with a touch-sensitive device (not shown). The touch-sensitive device has a touch-sensitive surface comprising sensors in at least one dimension to detect contact and movement of at least one object (input tool), such as a pen/stylus or finger near or on the touch-sensitive surface. Therefore, users may be able to input commands or signals via the display device 140.

It could be understood that each of the elements or modules in the presented embodiments may be a device having a corresponding function, which may have the appropriate hardware circuits or elements to perform the corresponding function, however, the device is not limited to be entity device, which may also be a virtual device having program codes and software(s) with respective functions or a device having capabilities for processing and running the program codes and software(s). The manner of operations of the respective elements may further refer to the following description of the methods. Specifically, the image processing system 100 may control the operation of the image input device 110, the storage device 130, and the display device 140 via the image processor 120 to perform the method for enhancing image contrast of the present invention.

In the embodiments, the histogram information is the luminance histogram that shows the image luminance distribution. Calculation of the luminance histogram requires to divide the gray space into several bins, each of bins represents a different grayscale level, and the number of pixels within every bin can be calculated by a formula to obtain the luminance histogram. For example, in one embodiment, the input image 10 may have 256 bins, but the invention is not limited thereto.

Figure 2:
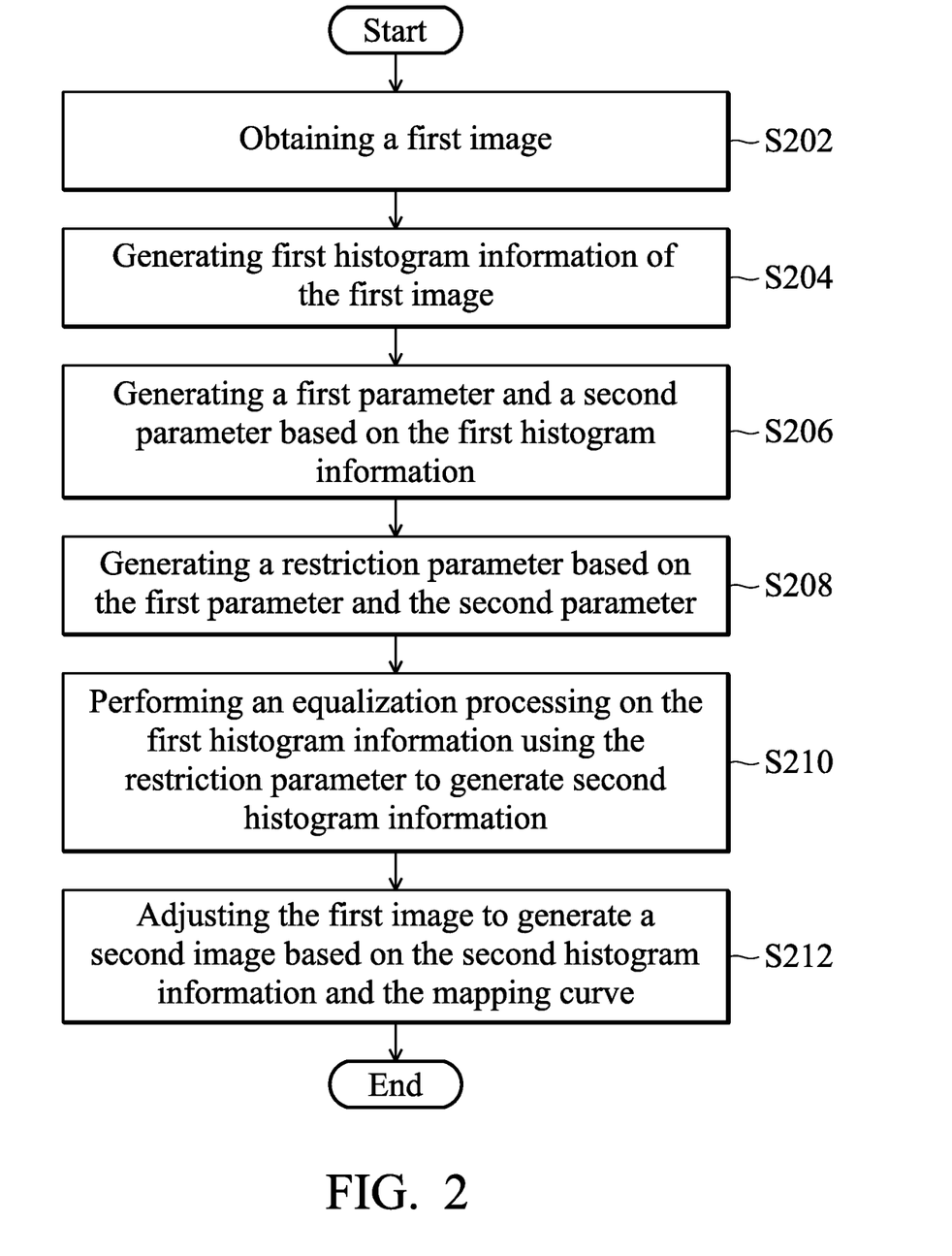
FIG. 2 is a flowchart of a method for enhancing image contrast according to an exemplary embodiment.

FIG. 2 is a flowchart of a method for enhancing image contrast according to an exemplary embodiment of the invention. Please refer together with FIG. 1 and FIG. 2. The method for enhancing image contrast in accordance with the embodiments of the invention may be applied to an image processing system, for example, the image processing system 100 as shown in FIG. 1, and the method may be performed by the image processor 120.

First, in step S202, the image processor 120 obtains a first image (e.g., the input image 10) from the image input device 110 or the storage device 130. Next, in step S204, a first histogram information of the first image is generated. In step S204, it is assumed that the total number of pixels of the first image is X and the image bin is set as N bins in the range of [0' N−1], where N>0 (e.g. N=256). Thus, the image processor 120 may calculate the number of pixels (in the total number of pixels X of the first image) appearing on each bin to obtain the first histogram information, representing the luminance distribution of the first image. For example, when N is set to 256, it means that the first histogram information has 256 bins from the 0th bin to the 255th bin.

In step S206, the image processor 120 generates a first parameter and a second parameter corresponding to the first image based on the first histogram information, wherein the first parameter is related to the number of homogeneous regions of the first image and the second parameter is related to an average luminance information of the first image.

When the first histogram information includes N bins, the first parameter peakCnt may represent the number of bins whose number of pixels exceeds the average number of pixels in the N bins of the first image. In particular, the image processor 120 may firstly calculate the first parameter peakCnt according to the first histogram information. There exists a negative correlation between the first parameter peakCnt and the size/number of homogeneous regions of the scene. For example, the smaller the value of peakCnt is, the narrower the histogram is, which indicates that there are more homogeneous regions and less details in the image. In some embodiments, the first parameter peakCnt may be calculated by following steps: determining a threshold value based on the total number of pixels and the total number of bins; comparing the threshold value with the number of pixels in each bin; and, incrementing the peakCnt by 1 when the number of pixels of a particular bin exceeds the threshold value until all the bins are compared.

In addition, the second parameter fmean is related to an average luminance of the image. For example, the second parameter fmean may be calculated according to the average luminance Ymean of the image. In particular, the average luminance Ymean is the average of the luminance values of all or part of pixels of an image. The smaller the Ymean is, the darker the scene is.

In one embodiment, the second parameter fmean can be obtained according to the following equation (1):

$$fmean = 1 - k1 * Ymean \quad (1),$$

where Ymean represents the average luminance of the first image and k1 is a preset value with the range of 0 to 1. It can be seen that there exists a negative correlation between the second parameter fmean and the average luminance Ymean of the image, that is, the smaller the Ymean is, the larger the fmean is. Specifically, when fmean is larger, the image scene is darker, and thus contrast enhancement of the image should be adjusted more.

After obtaining the first parameter and the second parameter, in step S208, the image processor 120 generates a restriction parameter based on the first parameter and the second parameter. In some embodiments, the image processor 120 may perform the following steps to perform a weighted calculation based on the first and second parameters to determine the restriction parameter: determining a first weight corresponding to the first parameter and a second weight corresponding to the second parameter, wherein the first weight is related to the first parameter and the second weight is determined by the first weight; and performing the weighted calculation based on the first parameter and the second parameter using the first weight and the second weight, respectively, to generate the restriction parameter.

Specifically, the image processor 120 may calculate the first weight wt1 corresponding to the first parameter peakCnt based on the first parameter peakCnt and a preset experiential value k2. In one embodiment, the first weight wt1 corresponding to the first parameter peakCnt may be calculated according to the following equation (2):

$$wt1 = 1 - k2 * peakCnt \quad (2),$$

Where the first weight wt1 corresponding to the first parameter peakCnt is in the range of 0 to 1, and k2 is a preset value with the range of 0 to 1. There exists a negative correlation between the first weight wt1 and the first parameter peakCnt. That is, the smaller the value of peakCnt is, the greater the wt1 is.

Then, the image processor 120 may perform a weighted calculation based on the first parameter peakCnt and the second parameter fmean to obtain the restriction parameter clipLmtTh, wherein the first parameter peakCnt and the second parameter fmean are related to the size/number of homogeneous regions and the average luminance of the image, respectively. In one embodiment, the contrast restriction parameter clipLmtTh can be obtained by the following equation (3):

$$clipLmtTh = (wt1 * peakCnt + wt2 * fmean) / (wt1 + wt2), \quad (3)$$

where the second weight wt2 corresponding to the second parameter fmean can be obtained from wt2=1−wt1.

For purpose of illustration, the contrast restriction parameter clipLmtTh of the invention is determined by the image luminance and the number of homogeneous regions, so that different contrast restriction parameters can be determined according to different scenes and provided to the processing of different scenes. In the method of adaptive contrast limitation of the present invention, if the size/number of homogeneous regions of a scene is greater (i.e., smaller first parameter peakCnt and less image details), the first weight wt1 will be greater and the second weight wt2 will be smaller, thus the contrast restriction parameter is mainly determined by the first parameter peakCnt. On the other hand, if the size/number of homogeneous regions is less (i.e., greater first parameter peakCnt and more image details), the first weight wt1 is smaller and the second weight wt2 is larger, and the contrast restriction parameter is mainly determined by the average luminance fmean of the image.

Figure 3A:
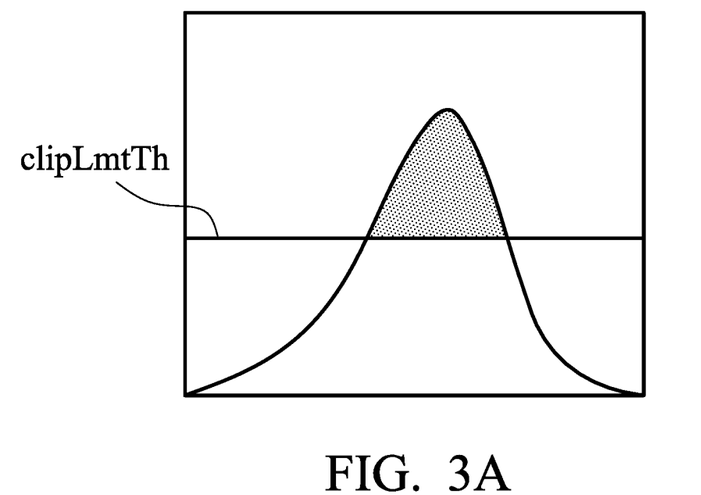
FIG. 3A is a schematic diagram illustrating an exemplary original histogram information according to an embodiment.
Figure 3B:
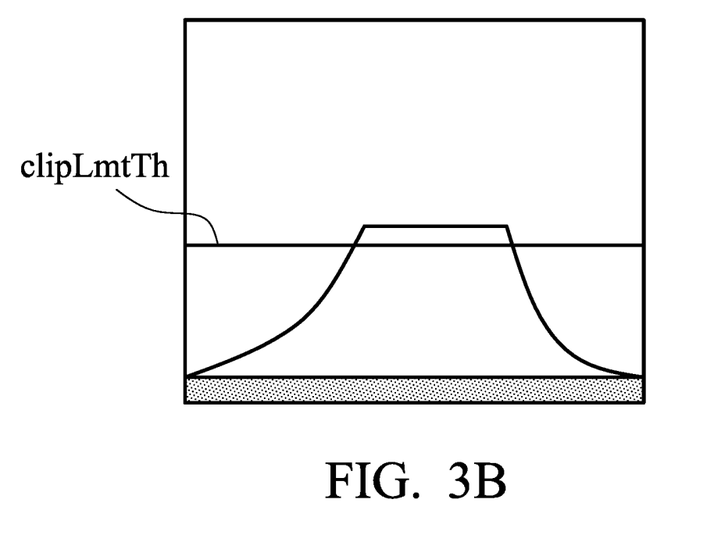
FIG. 3B is a schematic diagram illustrating an exemplary histogram generated after a contrast limited histogram equalization processing is performed on the original histogram information of FIG. 3A according to an exemplary embodiment.

After determining the restriction parameter, in step S210, the image processor 120 performs an equalization processing on the first histogram information using the restriction parameter to generate the second histogram information. Specifically, after the restriction parameter clipLmtTh is obtained, the image processor 120 may use the restriction parameter clipLmtTh to perform a contrast limited histogram equalization processing on the histogram of the original image, clip part pixels of the global histogram of the original image that exceeds the restriction parameter clipLmtTh, and evenly distribute them to the entire histogram to form a new histogram so as to achieve histogram equalization. The histogram equalization system changes the luminance histogram of the original image from a relatively concentrated bin level to be even distribution within the entire bin range. The histogram equalization is non-linear extension on the image and redistributes the image pixels to make the number of pixels within a certain gray scale range to be generally uniform. In particular, the smaller the value of clipLmtTh, the more part pixels to be clipped. Accordingly, the cumulative-distribution-function (CDF) curve becomes smoother and its slope becomes smaller, so that the less adjustment performed to the contrast of the image. Please refer to FIG. 3A and FIG. 3B. FIG. 3A is a schematic diagram illustrating exemplary original histogram information according to an embodiment of the invention. FIG. 3B is a schematic diagram illustrating an exemplary histogram generated after a contrast limited histogram equalization (CLHE) processing is performed to the original histogram information of FIG. 3A according to an exemplary embodiment of the invention, wherein clipLmtTh is a contrast limited parameter to be used in CLHE processing.

In step S212, the image processor 120 adjusts the first image based on the second histogram information and the mapping curve to generate a second image. For example, the image processor 120 may first acquire the first histogram information of the first image 10 and then obtain the first parameter and the second parameter corresponding to the first image 10 based on the size/number of the homogeneous regions and the average luminance based on the first histogram information, respectively, and perform a weighted calculation based on the first parameter and the second parameter to determine the restriction parameter, and perform peak-clipping processing on the image/scene histogram with the restriction parameter to obtain the second histogram information. In particular, different scenes/images may have different contrast restriction parameters, and different image histogram (the number of pixels of each bin in the image) can be performed with adaptive peak-clipping processing with using its corresponding contrast restriction parameters. Next, the image processor 120 obtains a cumulative-distribution-function (CDF) curve based on the second histogram information. In one embodiment, assuming that cdf[i] represents the number of all the pixels of the CDF curve accumulated up to the i-th bin, cdf[0]=pHist[0] can be defined and the corresponding value for each bin i in CDF can be accumulatively calculated by the following equation (4):

$$cdf[i]=cdf[i-1]+pHist[i], 1<i<N \quad (4),$$

Wherein cdf[i] represents the number of all pixels accumulated to the i-th bin, cdf[i−1] represents the number of all pixels accumulated to the (i−1)th bin, and pHist[i] represents the number of pixels in the i-th bin, and cdf[i] can be determined by adding cdf [i−1] and the number of pixels in the i-th bin.

In one embodiment, the CDF curve may be normalized to obtain a normalized CDF curve cdfNorm, for example let cdfNorm[i]=cdf[i]/cdf[binNum−1]. Normalization refers to make all the values in the CDF-curve within specific numerical range (e.g. 0~1). Then, a mapping curve was used to adjust the first image and generate the final pixel value of the second image. In particular, the contrast of the second image is enhanced compared to the contrast of the first image.

In some embodiments of the invention, an adaptive curve may be determined by performing a weighted calculation based on one high-contrast curve for enhancing image contrast and one low-contrast curve for enhancing details in dark area of the image, rather than only one fixed curve adopted in the prior art, thus providing better adaptive capability.

In some embodiments, the image processor 120 may provide a high-contrast curve and a low-contrast curve as two reference curves to generate a mapping curve firstly by the following steps: generating a CDF curve based on the second histogram information; generating an adaptive curve based on the high-contrast curve and the low-contrast curve; and using the adaptive curve to adjust the CDF curve to generate the mapping curve. In some embodiments, the image processor 120 further normalizes the CDF curve to generate a normalized CDF curve, and adjusts the normalized CDF curve using the adaptive curve to generate a mapping curve. Specifically, one adaptive curve can be obtained by performing a weighted calculation based on one preset high-contrast curve and one preset low-contrast curve in the present invention and used to adjust the CDF curve and generate a mapping curve, which may be disclosed in the following paragraphs.

Figure 4:
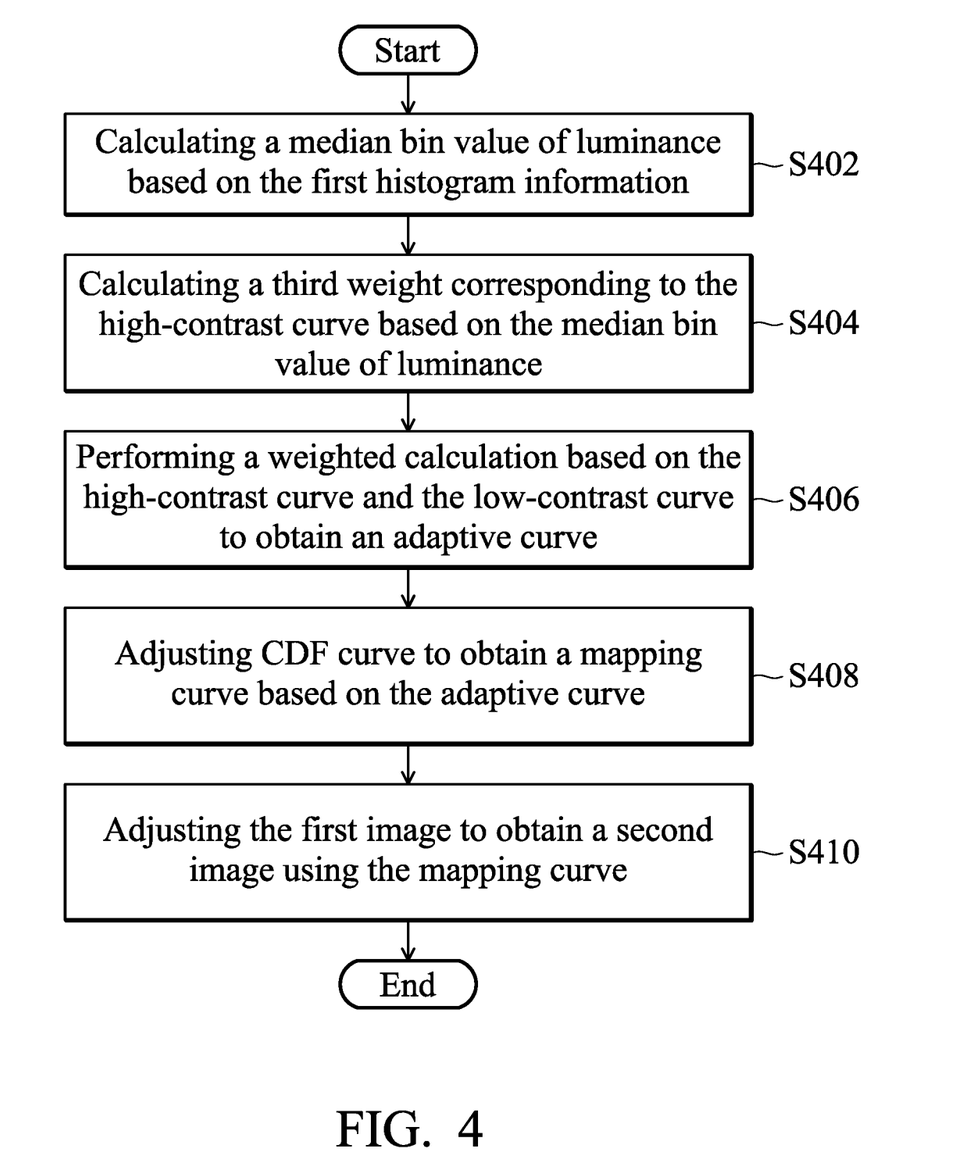
FIG. 4 is a flowchart of a method for enhancing image contrast according to another exemplary embodiment.

FIG. 4 is a flowchart of a method for enhancing image contrast according to another embodiment of the invention. Please refer together with FIG. 1 and FIG. 4. The method for enhancing image contrast in accordance with the embodiments of the invention may be applied to an image processing system, for example, the image processing system 100 as shown in FIG. 1, and the method may be performed by the image processor 120.

In step S402, the image processor 120 calculates a median bin value of luminance based on the first histogram information. In this step, the image processor 120 divides the histogram of the first image (contained in the first histogram information) into a left part and a right part. In one embodiment, the left part (e.g., bin 0-bin 127) is set as a dark area, the right part (e.g., bin 128-bin 255) is set as a bright area, and the median bin value of luminance binMedHi represents the bin value including a median pixel whose luminance value is the median of all the pixel luminance values after all pixels in the bright area are sequenced in terms of their luminance values. For example, in one embodiment, assuming that the total bin number N of the histogram is 8, the fourth bin (bin4) to the seventh bin (bin7) may be set to a bright area, and if the number of pixels in bin4, bin5, bin6, and bin7 are 10, 7, 5 and 1, respectively, then the median bin value binMedHi of luminance of the histogram is bin5.

In step S404, the image processor 120 calculates a third weight corresponding to the high-contrast curve based on the median bin value of luminance. In one embodiment, the third weight Wt3 corresponding to the high-contrast curve yLUTHi can be obtained by the following equation (5):

$$Wt3=1-k3*(binMedHi+b) \quad (5),$$

where binMedHi represents the median bin value of luminance, k3 and b are preset parameters associated with division of the bright area, and range from 0 to 1. Thus, there exists a negative correlation between the third weight Wt3 and the median bin value of luminance binMedHi.

In step S406, the image processor 120 performs a weighted calculation based on the high-contrast curve and the low-contrast curve to obtain an adaptive curve, wherein the high-contrast curve and the low-contrast curve can be set in advance. In some embodiments, the image processor 120 performs a weighted calculation based on the high-contrast curve yLUTHi and the low-contrast curve yLUTLow to generate the adaptive curve yLUT may further comprise the following steps: calculating a third weight Wt3 corresponding to the high-contrast curve yLUTHi and a fourth weight Wt4 corresponding to the low-contrast curve yLUTLow; and performing a weighted calculation based on the high-contrast curve yLUTHi, the low-contrast curve yLUTLow, the third weight Wt3 and the fourth weight Wt4 to generate the adaptive curve yLUT. In one embodiment, the adaptive curve yLUT can be determined by the following equation (6):

$$yLUT = Wt3 * yLUTHi + Wt4 * yLUTLow \quad (6)$$

where $Wt3 = 1 - Wt4$.

It can be seen that there exists a negative correlation between the fourth weight $Wt4$ and the third weight $Wt3$ and there exists a positive correlation between the fourth weight $Wt4$ and the median bin value of luminance binMedHi.

Figure 5:
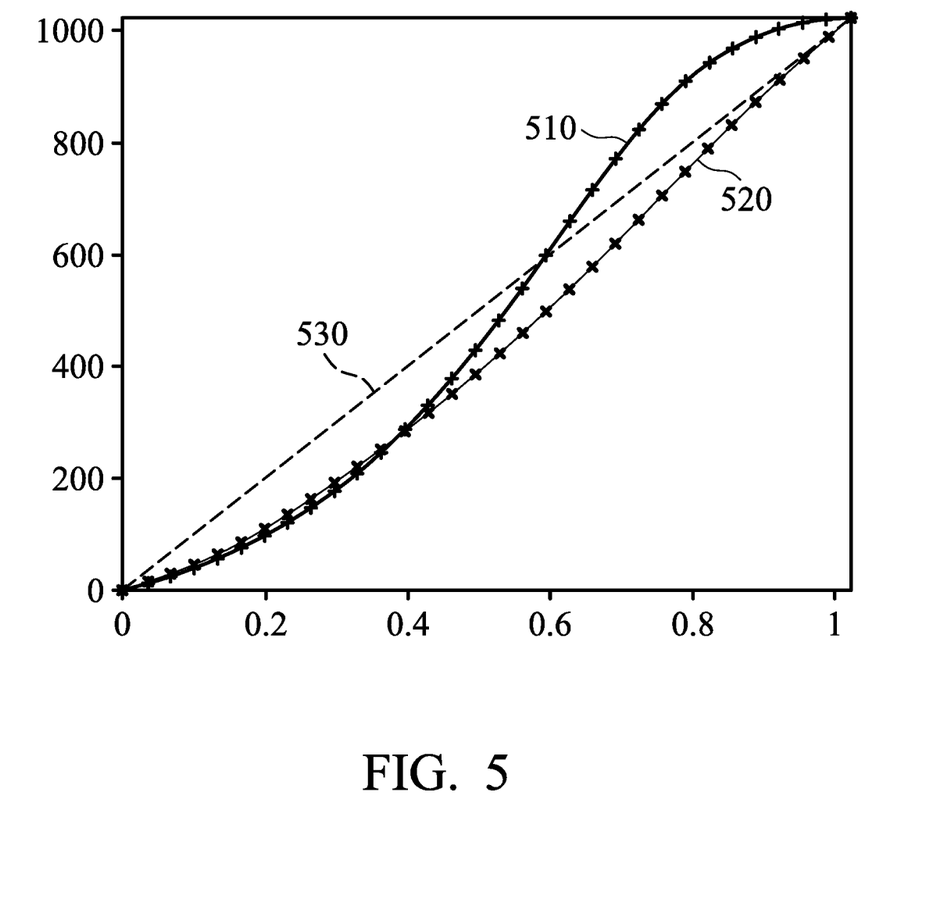
FIG. 5 is a schematic diagram illustrating exemplary high-contrast curve and low-contrast curve according to an embodiment.

FIG. 5 is a schematic diagram illustrating two exemplary reference curves according to an embodiment of the present invention. In FIG. 5, curve 510 is a high-contrast curve, curve 520 is a low-contrast curve, the dotted line 530 is a y=x curve, and the x coordinate and the y coordinate both represent the luminance value of the pixel. As can be seen from FIG. 5, the higher contrast of the curve is, the more obvious S-shape of the curve is, and the greater slope of the median luminance area (such as the middle part of the x-axis shown in the figure). Therefore, the adaptive curve yLUT will be adaptively adjusted to between the two curves depending on different scenes.

In step S408, the image processor 120 adjusts the CDF curve based on the adaptive curve to obtain a mapping curve. In one embodiment, the CDF curve can be adjusted by using the adaptive curve yLUT and interpolated according to the following equation (7) to obtain a mapping curve mapLUT:

$$mapLUT[i] = yLUT[j] + (cdf[i] - xLUT[j]) * (yLUT[j+1] - yLUT[j])/(xLUT[j+1] - xLUT[j]),$$

where i and j are non-negative numbers, mapLUT[i] is the value of the mapping point corresponding to the i-th interpolation point cdf[i] of the CDF curve, xLUT[j] and yLUT[j] are the (x, y) coordinates of the jth item of the adaptive curve yLUT, respectively, and xLUT[j+1] and yLUT[j+1] are the (x, y) coordinates of the (j+1)-th item of the adaptive curve yLUT, respectively.

For example, assume that m=g(n) is modulated by a function y=f(x), then there is a relationship: y=f (g(n)); where i represents ith item of interpolation results of the mapping curve mapLUT and j represents the jth item of the adaptive curve yLUT. That is, the (x, y) coordinates of the jth point on the curve are (xLUT [j]), yLUT[j]). The above equation (7) shows that when the value of the i-th item of the normalized CDF curve cdf falls within the range of the jth to j+1 items of xLUT, the i-th item of the mapLUT can be determined by interpolating between the two points (xLUT [j], yLUT[j]) and (xLUT[j], yLUT[j]) in the two-dimensional coordinate system. In this case, the interpolated result is the two-dimensional point with coordinates (cdf[i], mapLUT[i]), and take the y coordinate of this point as the result of the ith item of the adjusted curve. For example, the mapping curve mapLUT may be mapped according to the CDF curve via the above-described equation and the interpolation processing.

In one embodiment, the normalized CDF curve is adjusted by using the adaptive curve yLUT and interpolated according to the following equation (8) to obtain a mapping curve mapLUT:

$$mapLUT[i] = yLUT[j] + (cdfNorm[i] - xLUT[j]) * (yLUT[j+1] - yLUT[j])/(xLUT[j+1] - xLUT[j]),$$

where i and j are positive integers, mapLUT[i] is the value of the mapping point corresponding to the i-th interpolation point cdfNorm[i] of the normalized CDF curve cdfNorm, xLUT[j] and yLUT[j] are the (x, y) coordinates of the jth item of the adaptive curve yLUT, respectively, and xLUT [j+1] and yLUT[j+1] are the (x, y) coordinates of the (j+1)-th item of the adaptive curve yLUT, respectively.

In step S410, the image processor 120 adjusts the first image by using the mapping curve to obtain a second image. Note that the contrast of the second image is enhanced compared with the contrast of the first image, that is, the global contrast and luminance of the first image can be adjusted by the mapping curve to obtain a second image with contrast enhancement effect.

Therefore, according to image processing systems and associated methods for enhancing image contrast of the present invention, different contrast restriction parameters and different mapping curves can be determined according to different scenes to make good use of the advantage of histogram equalization and to minimize drawbacks in order to obtain better image/video contrast adjustment results, thus not only optimizing enhancement of scene luminance and image contrast but also making it easy to be used in engineering applications.

Systems and methods thereof, or certain aspects or portions thereof, may take the form of a program code (i.e., executable instructions) embodied in tangible media, such as floppy disks, CD-ROMS, hard disks, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wire or cable, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in the art can still make various alterations and modifications without departing from the scope and spirits of the invention. Therefore, the scope of the present invention shall be defined and protected by the following claims and their equivalents.

What is claimed is:

1. A method for enhancing image contrast applied to an image processing system, comprising:
   obtaining a first image;
   generating a first histogram information based on the first image;
   obtaining a first parameter and a second parameter of the first image based on the first histogram information;
   performing a weighted calculation based on the first parameter and the second parameter to determine a restriction parameter;
   performing a contrast limited histogram equalization processing on the first histogram information by using the restriction parameter to generate a second histogram information; and
   adjusting the first image based on the second histogram information and a mapping curve to generate a second image with contrast enhancement effect,
   wherein the first parameter is related to the size/number of homogeneous regions of the first image, the second parameter is related to the average luminance of the first image.

2. The method for enhancing image contrast of claim 1, wherein the first parameter is the number of bins whose number of pixels exceeds the average number of pixels in the N bins of the first image and a negative correlation exists between the first parameter and the size/number of homogeneous regions of the first image.

3. The method for enhancing image contrast of claim 1, wherein a negative correlation exists between the second parameter and the average luminance of the first image.

4. The method for enhancing image contrast of claim 1, further comprising:
determining a first weight corresponding to the first parameter and a second weight corresponding to the second parameter, wherein a negative correlation exists between the first weight and the number of homogeneous regions of the first histogram information and a positive correlation exists between the second weight and the number of homogeneous regions of the first histogram information; and
performing the weighted calculation based on the first parameter and the second parameter by using the first weight and the second weight, respectively, to determine the restriction parameter.

5. The method for enhancing image contrast of claim 1, wherein the restriction parameter is obtained according to the following equation:

$$clipLmtTh = wt1 * peakCnt + wt2 * fmean,$$

where clipLmtTh represents the restriction parameter, peakCnt represents the first parameter, fmean represents the second parameter, wt1 represents a first weight, and wt2 represents a second weight.

6. The method for enhancing image contrast of claim 1, further comprising:
generating a cumulative-distribution-function (CDF) curve based on the second histogram information;
generating an adaptive curve based on a high-contrast curve and a low-contrast curve; and
using the adaptive curve to adjust the CDF curve to generate the mapping curve.

7. The method for enhancing image contrast of claim 6, wherein the high-contrast curve is used to enhance the contrast of the first image, and the low-contrast curve is used to enhance details in the dark area of the first image.

8. The method for enhancing image contrast of claim 6, wherein the adaptive curve is determined by performing a weighted calculation based on the high-contrast curve with a third weight and the low-contrast curve with a fourth weight, wherein the adaptive curve falls between the high-contrast curve and the low-contrast curve.

9. The method for enhancing image contrast of claim 6, wherein a negative correlation exists between a third weight corresponding to the high-contrast curve and a median bin value of luminance in the first histogram information, and a positive correlation exists between a fourth weight corresponding to the low-contrast curve and the median bin value of luminance.

10. The method for enhancing image contrast of claim 6, wherein the mapping curve is obtained according to the following equation:

$$mapLUT[i] = yLUT[j] + (cdf[i] - xLUT[j]) * (yLUT[j+1] - yLUT[j])/(xLUT[j+1] - xLUT[j]),$$

where i and j are non-negative numbers, mapLUT[i] is the value of the mapping point corresponding to the i-th interpolation point cdf[i] of the CDF curve,
xLUT[j] and yLUT[j] are the (x, y) coordinates of the jth item of the adaptive curve, respectively, and
xLUT[j+1] and yLUT[j+1] are the (x, y) coordinates of the (j+1)-th item of the adaptive curve yLUT, respectively.

11. The method for enhancing image contrast of claim 6, further comprising:
normalizing the CDF curve to generate a normalized CDF curve; and
adjusting the normalized CDF curve based on the adaptive curve to generate the mapping curve.

12. The method for enhancing image contrast of claim 11, wherein the mapping curve is obtained according to the following equation:

$$mapLUT[i] = yLUT[j] + (cdfNorm[i] - xLUT[j]) * (yLUT[j+1] - yLUT[j])/(xLUT[j+1] - xLUT[j]),$$

where i and j are positive integers, mapLUT[i] is the value of the mapping point corresponding to the i-th interpolation point cdfNorm[i] of the normalized CDF curve,
xLUT[j] and yLUT[j] are the (x, y) coordinates of the jth item of the adaptive curve, respectively, and
xLUT[j+1] and yLUT[j+1] are the (x, y) coordinates of the (j+1)-th item of the adaptive curve yLUT, respectively.

13. The method for enhancing image contrast of claim 1, wherein the method is applied in the tone mapping of image processing.

14. An image processing system comprising:
an image input device;
a storage device; and
an image processor coupled to the image input device and the storage device, obtaining a first image from the image input device or the storage device, generating a first histogram information based on the first image, obtaining a first parameter and a second parameter of the first image based on the first histogram information, performing a weighted calculation based on the first parameter and the second parameter to determine a restriction parameter, performing a contrast limited histogram equalization processing on the first histogram information by using the restriction parameter to generate a second histogram information, and adjusting the first image based on the second histogram information and a mapping curve to generate a second image with contrast enhancement effect,
wherein the first parameter is related to the size/number of homogeneous regions of the first image, the second parameter is related to the average luminance of the first image.

15. The image processing system of claim 14, wherein the first parameter is the number of bins whose number of pixels exceeds the average number of pixels in the N bins of the first image and a negative correlation exists between the first parameter and the size/number of homogeneous regions of the first image.

16. The image processing system of claim 14, wherein a negative correlation exists between the second parameter and the average luminance of the first image.

17. The image data processing system of claim 14, wherein the image processor further determines a first weight corresponding to the first parameter and a second weight corresponding to the second parameter, and performs the weighted calculation based on the first parameter and the second parameter by using the first weight and the second weight, respectively, to generate the restriction parameter, wherein a negative correlation exists between the first weight and the number of homogeneous regions of the first histogram information, and a positive correlation exists between the second weight and the number of homogeneous regions of the first histogram information.

18. The image processing system of claim 14, wherein the image processor further generates a cumulative-distribution-function (CDF) curve based on the second histogram information, generates an adaptive curve based on a high-contrast curve and a low-contrast curve, and uses the adaptive curve to adjust the CDF curve to generate the mapping curve.

19. The image processing system of claim 18, wherein the image processor further normalizes the CDF curve to generate a normalized CDF curve and adjusts the normalized CDF curve based on the adaptive curve to generate the mapping curve.

* * * * *